Nov. 1, 1966 M. A. HULLEY 3,283,201
ELECTROSTATICALLY FOCUSED TRAVELLING WAVE TUBES
WITH SLOW WAVE STRUCTURE BETWEEN TWO FOCUSING
ELECTRODES AND APARALLEL TO ONE ELECTRODE
Filed Jan. 3, 1963 2 Sheets-Sheet 2
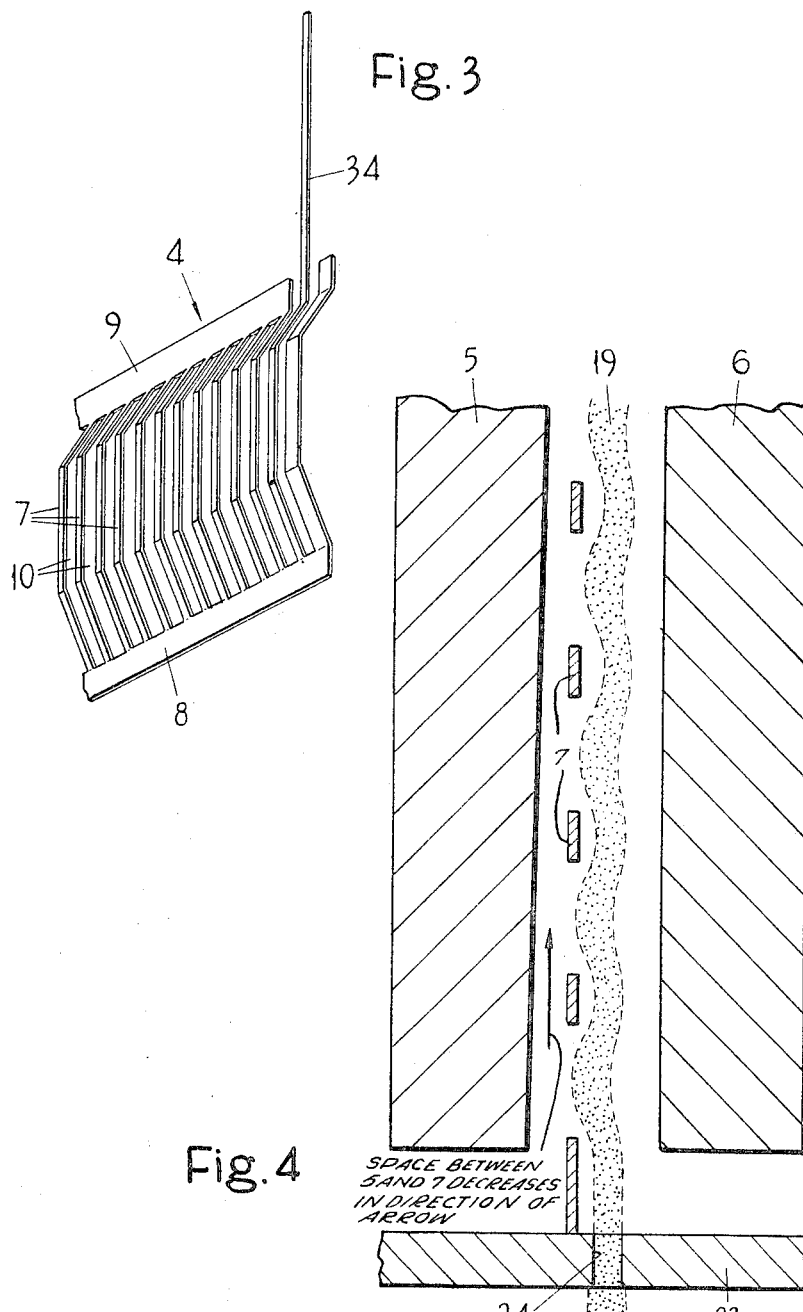
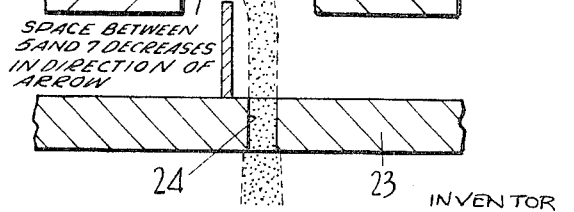
INVENTOR
MICHAEL ALAN HULLEY
BY
ATTORNEYS

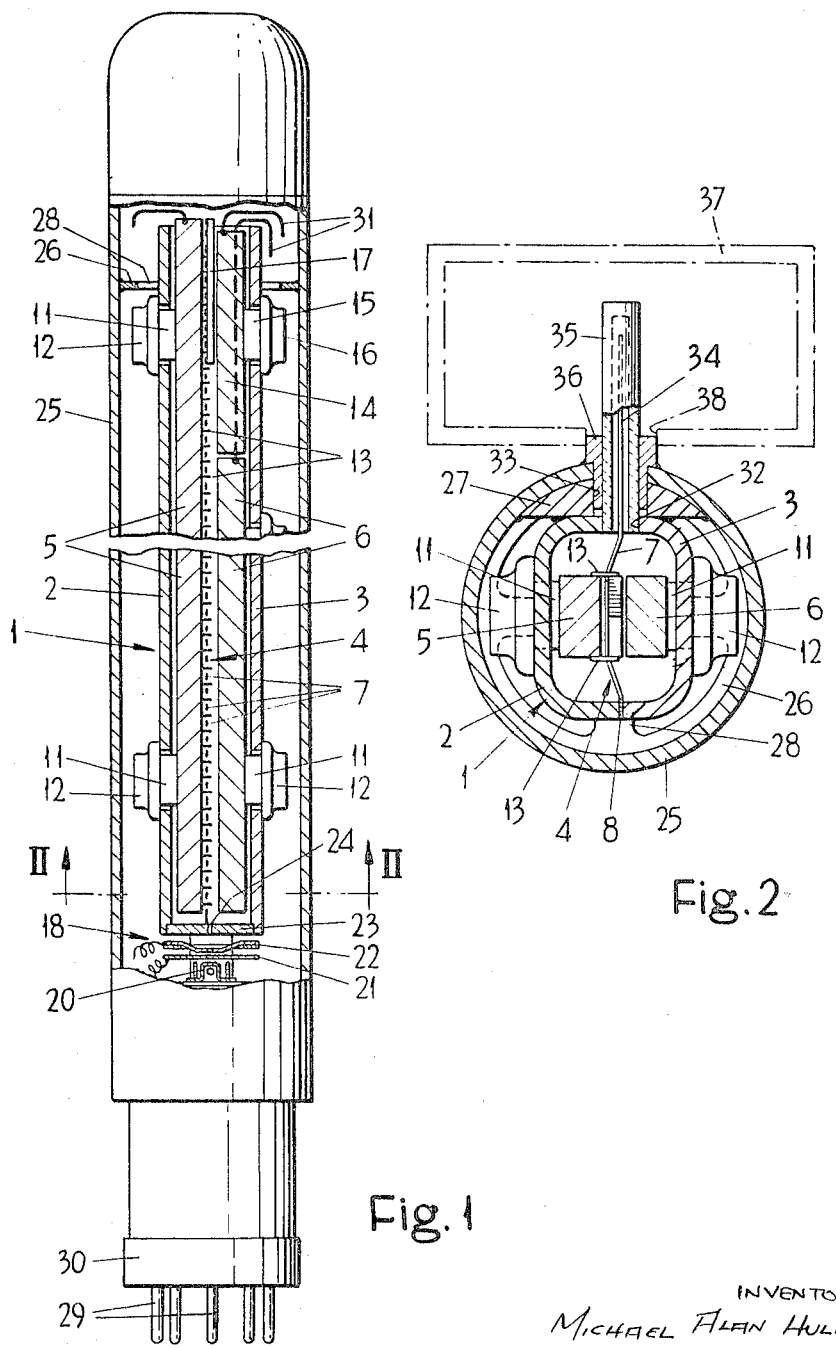

3,283,201
ELECTROSTATICALLY FOCUSED TRAVELLING WAVE TUBES WITH SLOW WAVE STRUCTURE BETWEEN TWO FOCUSING ELECTRODES AND APARALLEL TO ONE ELECTRODE
Michael Alan Hulley, Wembley, England, assignor to The M-O Valve Company Limited, London, England
Filed Jan. 3, 1963, Ser. No. 249,260
Claims priority, application Great Britain, Jan. 11, 1962, 1,072/62
3 Claims. (Cl. 315—3.6)

This invention relates to travelling wave tubes.

The invention is concerned in particular with travelling wave tubes of the kind including a delay device which is at least partly in the form of a periodic metal structure, two further metal structures respectively extending on either side of the periodic metal structure, said further metal structures being electrically insulated from each other and from the periodic metal structure, and a first one of the further metal structures being disposed nearer to the periodic metal structure than is the other further metal structure, and an electron gun having an electron source which is electrically insulated from the periodic metal structure, the gun being disposed adjacent one end of the periodic metal structure and being arranged to project an electron beam into the space between the periodic metal structure and said other further metal structure so as to travel along a channel constituted by at least part of the length of said space, the arrangement being such that, in operation, upon applying suitable static potentials to the periodic structure and to the further metal structures such that the periodic structure is at a positive potential with respect to the electron source, said other further metal structure is at a negative potential with respect to the periodic structure, and said first further metal structure is at a negative potential with respect to said other further metal structure, the electron beam will be focussed electrostatically, the beam travelling through said space generally in a direction parallel to the length of the periodic structure and with an undulatory motion such that it alternately approaches and recedes from periodic structure with those peaks of the beam forming that set of alternate peaks disposed adjacent the periodic structure being respectively disposed in the vicinities of the gaps in the periodic structure; travelling wave tubes of the kind specified form the subject of U.S. Patent No. 2,973,453.

In this specification, by the term periodic metal structure is meant a series of metallic elements which are spaced apart along a given path (the length of the structure) and all of which extend in a similar manner transversely to said path; the elements may for example take the form of the rungs of a ladder-like structure.

According to the invention, in a traveling wave tube of the kind specified adapted to operate as a backward wave oscillator, the spacing between the periodic structure and said first further metal structure varies substantially monotonically along the length of said channel with the maximum value of said spacing along the channel corresponding to that end of the channel adjacent the electron gun.

Preferably, in a travelling wave tube according to the present invention, the value of the ratio of the maximum value of said spacing along the channel to the minimum value of said spacing along the channel lies between 1:1 and 1:3.

Hitherto, difficulties have been experienced with travelling wave tubes of the kind specified adapted to operate as backward wave oscillators due to the tendency of such oscillators to generate simultaneously signals at more than one frequency, particularly when such oscillators are operated with relatively high beam currents. It has been found that, with such an oscillator, for beam currents up to a certain value the oscillator generates only one signal at a desired fundamental frequency, but that if the beam current is increased above this value a series of spurious signals having frequencies lower than the fundamental frequency begin to appear in the output of the oscillator; the most significant of these spurious signals appears to be that of the spurious signals (hereinafter referred to as to the second signal) whose frequency is nearest to the fundamental frequency. Thus, hitherto, in order to restrict the amplitude of any such spurious signals to an acceptably low level, it has been necessary in operation of such an oscillator to restrict the magnitude of the beam current with the result that the power output of the oscillator is restricted.

It is found that the present invention enables the difficulties discussed above to be alleviated. Thus, it has been found that in a travelling wave tube in accordance with the present invention, the output power which may be obtained from the oscillator without any significant spurious signal appearing in the output is considerably greater than in the case of a similar travelling wave tube in which said first one of the further metal structures is substantially parallel to the periodic structure.

It is thought that the reason why the present invention brings about an improvement in this respect is that the field strength of any second signal which may occur in operation of a travelling wave tube of the kind specified adapted to operate as a backward wave oscillator is at a maximum in a region adjacent that end of the channel for the electron beam remote from the electron gun. Now since in a backward wave oscillator in accordance with the invention, along the length of the channel, said first further metal structure is nearest to the periodic structure at that end of the channel remote from the electron gun, the electrons of the beam are most strongly repelled from said first further metal structure in the vicinities of the gaps of the periodic structure adjacent this end of the channel, with the result that the electron beam will tend to diverge away from said first further metal structure at this end. Thus, in operation of such an oscillator there will be relatively weak coupling between the electron beam and the electromagnetic waves travelling along the delay device at that end of the channel remote from the electron gun, so that if any second signal does occur it will tend to be of relatively small magnitude.

One arrangement in accordance with the present invention will now be described by way of example with reference to the accompanying drawings, in which:

FIGURE 1 is a side elevation, shown partly in section, of a travelling wave tube adapted to operate as a backward wave oscillator at frequencies of the order of 10,000 mc./s., the section being taken along the longitudinal axis of the tube;

FIGURE 2 is an enlarged sectional elevation of the tube, the section being taken along the line II—II of FIGURE 1;

FIGURE 3 is an enlarged fragmentary perspective view of the periodic metal structure incorporated in the tube; and FIGURE 4 is a schematic representation of part of the tube, illustrating its mode of operation.

Referring to the drawings, the delay device of the travelling wave tube includes a tubular metal member 1 of generally rectangular cross-section formed by two channel members 2 and 3 of U-shaped cross section, the tubular member 1 being 8.9 centimetres in length and having internal cross-section dimensions of approximately 1 centimetre by 0.75 centimetre. The delay device also includes a periodic metal structure 4 which extends along the whole length of the tubular member 1, and two elongated metal focussing plates 5 and 6 of rectangular cross-section which are disposed inside the tubular member 1 on either side of the periodic structure 4, the plate 5 extending along substantially the whole length of the tubular member 1 and the plate 6 extending along the major part of the length of the member 1.

The periodic structure 4 is formed by a series of metal strips 7, each 0.038 centimetre wide, which extend across the wider internal dimension of the tubular member 1, the ends of each strip 7 being respectively formed integral with two longitudinal strips 8 and 9; the strips 7 are spaced equal distances apart, a slot 10 0.089 centimetre wide being formed between each adjacent pair of strips 7. The strips 7 are all bent in a similar manner so that each strip 7 is formed by three straight portions, and the periodic structure 4 is mounted in position in the tubular member 1 with the longitudinal strips 8 and 9 clamped between the channel members 2 and 3, the periodic structure 4 being so arranged that the strips 7 each present a concave configuration to the focussing plate 6. The central straight portion of each strip 7 is 0.56 centimetre in length, and the main faces of these central portions are parallel to the broader walls of the tubular member 1 with corresponding main faces of the portions all lying in the same plane.

The focussing plates 5 and 6 each have a width equal to the length of the central portions of the strips 7 and are arranged with their axes parallel to, and disposed midway between, the narrower walls of the tubular member 1. The plate 5 is 2.5 centimetres longer than the plate 6 and extends beyond the plate 6 to this amount at one end. The plate 6 is disposed on the concave side of the periodic structure 4 with its main faces parallel to the main faces of the central portions of the strips 7, that main face of the plate 6 nearer the central portions being spaced 0.075 centimetre from these portions. That main face of the plate 5 nearer the periodic structure 4 is ground in such a manner that it is inclined at a slight angle to the central portions of the strips 7 and is at right angles to the narrower walls of the tubular member 1; at its end which projects beyond the plate 6, the plate 5 is spaced 0.023 centimetre from the central portion of the relevant end strip 7 and at its other end the plate 5 is spaced 0.03 centimetre from the central portion of the relevant end strip 7, the spacing between the plate 5 and the central portions of the strips 7 varying linearly along the length of the periodic structure 4. Each focussing plate 5 or 6 is secured to, and electrically insulated from, the adjacent broad wall of the tubular member 1 by means of a pair of ceramic support studs 11, each stud 11 being secured inside a metal collar 12 which is in turn brazed to the relevant wall of the tubular member 1.

A number of metal pins 13 are secured to the sides of the plate 5, the pins 13 projecting just over half-way across the gap between the two plates 5 and 6. The arrangement is such that each pair of the pins 13 projects through a slot 10 of the periodic structure 4, each pair of pins 13 being symmetrically disposed with respect to the relevant slot 10.

The travelling wave tube includes a collector electrode 14 in the form of a short metal strip which has the same cross-sectional dimensions as the plates 5 and 6 and which is aligned with the plate 6, so as to form in effect a continuation of the plate 6, that end of the collector electrode 14 remote from the plate 6 being adjacent the corresponding end of the plate 5; there is a gap of 0.025 centimetre between the adjacent ends of the collector electrode 14 and the plate 6, and the collector electrode 14 is supported from the adjacent broad wall of the tubular member 1 by means of a further ceramic support stud 15 secured inside a further metal collar 16 brazed to this wall. An attenuating member in the form of a wedge 17 of porous quartz loaded with carbon is disposed between the collector electrode 14 and the adjacent part of the periodic structure 4, the wedge 17 being secured to the periodic structure 4.

The travelling wave tube also includes an electron gun 18 disposed adjacent that end of the tubular member 1 remote from the collector electrode 14 and arranged to project a strip-like beam 19 of electrons into the space between the periodic structure 4 and the plate 6; the arrangement is such that the spacing between the focussing plate 5 and the central portions of the strips 7 is at a maximum at that end of the tubular member 1 adjacent the electron gun 18. The electron gun 18 includes an indirectly heated cathode 20, and three anodes 21, 22 and 23 arranged in sequence between the cathode 20 and the adjacent end of the tubular member 1. The final anode 23 is in the form of a plate which closes the adjacent end of the tubular member 1, and the three anodes 21, 22 and 23 respectively have formed in them three strip-like apertures 24 which extend in directions parallel to the main faces of the plate 6 and through which the electron beam 19 passes before emerging from the electron gun 18 in operation. As is clearly shown in FIGURE 4, that end strip 7 of the periodic structure 4 adjacent the electron gun 18 is wider than the remaining strips 7 and abuts against the anode 23 on that side of the aperture 24 of the anode 23 nearer the plate 5.

The assembly described above is mounted in an evacuated tubular metal envelope 25 of circular cross-section, the tubular member 1 being supported inside the envelope 25 by means of an annular member 26 which surrounds the tubular member 1 and fits tightly inside the envelope 25 adjacent that end remote from the electron gun 18, and by means of a support block 27 which fits between, and is brazed to, a part of one of the narrower walls of the tubular member 1 adjacent the electron gun and the adjacent part of the envelope 25; the spacer member 26 is provided with four inwardly projecting tongues 28 the free ends of which respectively bear resiliently against the four walls of the tubular member 1. A number of pins 29 are sealed through an electrically insulating base 30 at that end of the envelope 25 adjacent the electron gun 18, and are respectively electrically connected to the plates 5 and 6, the collector electrode 14, the cathode 20, and the anodes 21 and 22 by means of schematically indicated leads 31.

A circular aperture 32 is formed in that part of one of the narrower walls of the tubular member 1 which is brazed to the support block 27 (this part being in the region of the second transverse strip 7 from that end of the tubular member 1 nearer the electron gun 18), and a further circular aperture 33 is formed in the block 27. Part of the longitudinal strip 9 secured to this wall is cut away on either side of the second transverse strip 7 (as shown in FIGURE 3), and this strip 7 is extended so as to form a thin metal rod 34 which extends from the cut away portion of the strip 9. The rod 34 extends inside, and along the length of, a tube 35 of electrically insulating material one end of which is sealed inside the aperture 32, and the other end of which projects outside the envelope 25; that end of the tube 35 which projects outside the envelope 25 is closed. The tube 35 is sealed through a metal bush 36 which is in turn sealed through the wall of the envelope 25 and partly inside the aperture 33. The rod 34 serves as a radio frequency output connection for the travelling wave tube in conjunction with a waveguide 37 of rectangular cross-section arranged externally of the envelope 25, that part of the rod 34 disposed outside the envelope 25 being designed to project into, and approximately half-way across, the narrow internal dimension of the waveguide 37; the wall of the waveguide is provided with an aperture 38 inside which fits that part of the bush 36 which projects outside the envelope 25. Thus, the rod 34 acts as an antenna which in operation serves to excite a wave in the waveguide 37.

In operation, the cathode 20, the three anodes 21, 22 and 23, and the focussing plates 5 and 6 are connected to appropriate voltage sources such that the final anode 23 (which is electrically connected to the periodic structure 4, the tubular member 1 and the envelope 25) and the collector electrode 14 are earthed, an appropriate negative potential is applied to the cathode 20, a potential of about 16 volts positive with respect to the cathode potential is applied to the first anode 21, a potential of about 160 volts positive with respect to the cathode potential is applied to the second anode 22, an appropriate negative potential is applied to the focussing plate 5, and an appropriate negative potential (less than that applied to the focussing plate 5) is applied to the focussing plate 6. The potential applied to the cathode 20 may be varied between 450 and 2000 volts, the potential applied to the focussing plate 5 may also be varied between 450 and 2000 volts, and the potential applied to the focussing plate 6 may be varied between 135 and 600 volts; the ratios of the potentials respectively applied to the cathode 20 and the focussing plates 5 and 6 are kept substantially constant.

The arrangement is such that the electron beam 19 is electrostatically focussed as it travels along the channel partly defined by the periodic structure 4 and the focussing plate 6. The electrostatic field distribution along the general direction of travel of the beam 19 is such that there is an overall focussing action upon the beam 19 in directions perpendicular to the focussing plate 6, and the beam 19 travels along the above-mentioned channel with an undulatory motion such that it approaches the focussing plates 5 and 6 in turn, one set of peaks of the beam 19 being respectively disposed in the vicinities of successive slots 10 of the periodic structure 4, until it reaches that end of the plate 6 remote from the electron gun 18 whereupon it is bent towards, and is collected by, the collector electrode 14. The pins 13 serve to inhibit lateral dispersion of the electrons in the beam 19.

That part of the plate 5 which is adjacent that end of the plate 6 remote from the electron gun 18 is spaced .025 centimetre from the central portions of the adjacent strips 7. Thus, it will be appreciated that, along the length of the channel through which the electron beam 19 travels in operation, the value of the ratio of the maximum value of the spacing between the plate 5 and the periodic structure 4 to the minimum value of this spacing is about 1.2:1.

In operation, oscillations are set up in the travelling wave tube by virtue of interaction between the electron beam 19 and an electromagnetic wave propagated along the delay device constituted by the tubular member 1, the periodic structure 4 and the focussing plates 5 and 6, the group velocity of the wave being in a sense opposite to the direction of flow of the electron beam 19. A radio frequency output signal is obtained from the travelling wave tube via the waveguide 37, and the oscillation frequency of the travelling wave tube can be varied by varying the magnitude of the potentials applied to the cathode 20 and to the focussing plates 5 and 6.

By virtue of the fact that the spacing between the plate 5 and the central portions of the strips 7 gradually decreases along the length of the periodic structure 4 from that end adjacent the electron gun 18, the electron beam 19 will tend to diverge slightly from the plate 5 (as shown in an exaggerated manner in FIGURE 4) as it travels along the above-mentioned channel. Thus, in operation, the coupling between the electron beam 19 and the electromagnetic wave will gradually decrease along the length of the delay device from that end adjacent the electron gun 18, and it will be appreciated that, by virtue of this fact, the occurrence of any second signal will be inhibited.

It is found that in the travelling wave tube described above a beam current of 10 milliamperes may be used without any significant spurious signal appearing in the output of the tube. This performance may be compared with that of a similar travelling wave tube in which the focussing plates are both disposed parallel to the periodic structure; in this latter case the tube has been found to generate significant spurious signals when a beam current of greater than about 5 milliamperes is used.

I claim:
1. A travelling wave tube including a delay device which is at least partly in the form of a periodic metal structure, two further metal structures respectively extending on either side of the periodic metal structure, said further metal structures being electrically insulated from each other and from the periodic metal structure, a first one of the further metal structures being disposed appreciably nearer to the periodic metal structure than the other further metal structure, an electron gun having an electron source which is electrically insulated from the periodic metal structure, the gun being disposed adjacent one end of the periodic metal structure, and a radio frequency output connection connected to that end of the periodic structure adjacent the electron gun, the electron gun being arranged to project an electron beam into the space between the periodic structure and said other further metal structure so as to travel along a channel constituted by at least part of the length of said space, the spacing between the periodic structure and said first further metal structure varying substantially monotonically along the length of said channel with the maximum value of said spacing along the channel corresponding to that end of the channel adjacent the electron gun, and the arrangement being such that, in operation, upon applying suitable potentials to the periodic structure and to the further metal structures such that the periodic structure is at a positive potential with respect to the electron source, said other further metal structure is at a negative potential with respect to the periodic structure and said first further metal structure is at a negative potential with respect to said other further metal structure, the electron beam will be focussed electrostatically, the beam travelling through said space generally in a direction parallel to the length of the periodic structure and with an undulatory motion such that it alternately approaches and recedes from the periodic structure with those peaks of the beam forming that set of alternate peaks disposed adjacent the periodic structure being respectively disposed in the vicinities of the gaps in the periodic structure.

2. A travelling wave tube according to claim 1, in which said spacing varies substantially linearly along the length of the channel.

3. A travelling wave tube according to claim 1, in which the value of the ratio of the maximum value of said spacing along the channel to the minimum value of said spacing along the channel lines between 1:1 and 1:3.

References Cited by the Examiner
UNITED STATES PATENTS

| | | | |
|---|---|---|---|
| 2,730,648 | 1/1956 | Lerbs | 315—3.5 |
| 2,973,453 | 2/1961 | Hogg | 315—3.5 |

HERMAN KARL SAALBACH, *Primary Examiner.*

R. D. COHN, *Assistant Examiner.*